US012138965B2

United States Patent
Chang et al.

(10) Patent No.: US 12,138,965 B2
(45) Date of Patent: Nov. 12, 2024

(54) TIRE AND TIRE WEAR INDICATING STRUCTURE THEREOF

(71) Applicant: CHENG SHIN RUBBER IND. CO., LTD., Changhua County (TW)

(72) Inventors: En-Yu Chang, Changhua County (TW); Man-Chen Hu, Changhua County (TW)

(73) Assignee: Cheng Shin Rubber Ind. Co., Ltd., Changhua County (TW)

( * ) Notice: Subject to any disclaimer, the term of this patent is extended or adjusted under 35 U.S.C. 154(b) by 0 days.

(21) Appl. No.: 18/185,512

(22) Filed: Mar. 17, 2023

(65) Prior Publication Data
US 2024/0227458 A1  Jul. 11, 2024

(30) Foreign Application Priority Data
Jan. 11, 2023 (TW) .................. 112101236

(51) Int. Cl.
*B60C 11/117* (2006.01)
*B60C 11/03* (2006.01)
*B60C 11/24* (2006.01)

(52) U.S. Cl.
CPC ............ *B60C 11/24* (2013.01); *B60C 11/032* (2013.01)

(58) Field of Classification Search
CPC .............................. B60C 11/24; B60C 11/032
See application file for complete search history.

(56) References Cited

U.S. PATENT DOCUMENTS

| 6,523,586 | B1* | 2/2003 | Eromaki | B60C 11/24 |
| | | | | 152/DIG. 3 |
| 2015/0035971 | A1* | 2/2015 | Bogenschuetz | H04N 23/635 |
| | | | | 348/128 |
| 2019/0351712 | A1* | 11/2019 | Miyazaki | B60C 11/1353 |

FOREIGN PATENT DOCUMENTS

| CN | 110497743 B | 11/2021 |
| DE | 3627833 A1 * | 2/1988 |
| DE | 102015211532 A1 * | 12/2016 |
| EP | 2998131 B1 | 10/2018 |
| JP | 6557996 B2 | 8/2019 |
| WO | WO-2016/030033 A1 * | 3/2016 |
| WO | WO-2018/162822 A1 * | 9/2018 |

OTHER PUBLICATIONS

Machine translation for WO 2018/162822 (Year: 2023).*
Machine translation for WO 2016/030033 (Year: 2023).*
Machine translation for German 102015211532 (Year: 2023).*
Machine translation for German 3627833 (Year: 2023).*

* cited by examiner

*Primary Examiner* — Steven D Maki
(74) *Attorney, Agent, or Firm* — Rosenberg, Klein & Lee

(57) ABSTRACT

A tire and a tire wear indicating structure thereof are disclosed. The tire wear indicating structure includes an indicator, at least three inclined portions of different heights, and at least two indicating grooves. The indicator has an indicator depth. The inclined portions are adjacently arranged to each other and located in the indicator. The heights of the inclined portions decrease progressively. The indicating grooves are disposed between the adjacent inclined portions. The indicating grooves each have an indicating groove depth that is the main groove depth minus 1.8 to 2.2 mm and is greater than the indicator depth. The current wear condition of the tire can be seen more intui- (Continued)

tively, without too much information interfering with the judgment.

8 Claims, 15 Drawing Sheets

TIRE AND TIRE WEAR INDICATING STRUCTURE THEREOF

FIELD OF THE INVENTION

The present invention relates to a tire, and more particularly to a tire having a tire wear indicating structure.

BACKGROUND OF THE INVENTION

According to the regulations of FMVSS No. 139 New Pneumatic Radial Tires for Light Vehicles, for the safety of the public, a tire must be equipped with multiple tire wear indicators that are equidistant along the outer circumference of the main groove of the tread of the tire. Besides, indicating symbols are disposed on the shoulder portions at both sides of the tire.

In use, when the tread of the tire is worn to have the same height as the tire wear indicator, it means that the tire needs to be replaced immediately. However, the tire has been worn to the limit. For the public to judge the tire condition better, so as to replace the tire in time, different indicating structures are disclosed in European Patent Publication No. EP2998131B1, Japanese Patent Publication No. JP6557996B2 and Chinese Patent No. CN110497743B.

As disclosed in European Patent Publication No. EP2998131B1, the tire condition is mainly indicated by symbols such as DRY, WET and +, -. However, the symbols will lead to too much information on the tread, which makes it difficult to judge the tire wear status intuitively.

As disclosed in Japanese Patent Publication No. JP6557996B2, the tire is equipped with two indicating grooves for different wear degrees. By comparing the difference between the two indicating grooves to judge the tire condition, it is not easy to judge the tire wear condition intuitively via the wear degrees of the indicating grooves.

As disclosed in Chinese Patent No. CN110497743B, the tire wear condition is judged by multiple protrusions arranged at the bottom of the grooved hole of the tire. However, after the tire is worn down, the protrusions will disappear. If the user does not remember the original number of the protrusions, it is also difficult to judge the tire wear condition intuitively via the protrusions on the grooved hole of the tire.

Furthermore, as disclosed in Chinese Patent No. CN110497743B, because the grooved hole is disposed on the central pattern portion of the tire, the stiffness of the ribs on the central pattern portion will be weakened, resulting in a reduction in straight-line stability of the tire.

SUMMARY OF THE INVENTION

According to one aspect of the present invention, a tire wear indicating structure is provided. The tire wear indicating structure is disposed on a tire. The tire has a tread portion and a main groove adjacent to the tread portion. The main groove has a main groove depth. The tire wear indicating structure comprises an indicator, at least three inclined portions of different heights, and at least two indicating grooves. The indicator is disposed on the tread portion. The indicator has an indicator depth that is recessed from the tread portion. The indicator extends in a cross section of the tread portion along an indicator direction. The inclined portions are adjacently arranged to each other and located in the indicator. The heights of the inclined portions decrease progressively along the indicator direction. In every adjacent two of the inclined portions, a lowest point of one inclined portion is higher than a highest point of the other inclined portion along the indicator direction. The indicating grooves are disposed between the adjacent inclined portions. The indicating grooves each have an indicating groove depth. The indicating groove depth is the main groove depth minus 1.8 to 2.2 mm. The indicating groove depth is greater than the indicator depth.

Preferably, the tread portion includes a central segment and a shoulder segment that are arranged at two sides of the main groove, respectively. The indicator is disposed on the shoulder segment.

Preferably, the indicator depth is the main groove depth minus 2.3 to 2.5 mm.

Preferably, the inclined portions have a same length in the indicator direction.

Preferably, the tire has an inner side and an outer side. The indicator is arranged on both the inner side and the outer side.

According to another aspect of the present invention, a tire is provided. The tire comprises a tread portion, a main groove adjacent to the tread portion, and the foregoing tire wear indicating structure. The tire wear indicating structure is disposed on the tread portion.

According to the above-mentioned technical characteristics, the following effects can be achieved.

1. With the cooperation of the indicator, the inclined portions and the indicating grooves, the current wear condition of the tire can be seen more intuitively, without too much information interfering with the judgment.

2. Since the indicator is disposed on the shoulder segment, the stiffness of the ribs on the central segment will not be weakened, and the straight-line stability of the tire can be maintained.

DETAILED DESCRIPTION OF THE PREFERRED EMBODIMENTS

Embodiments of the present invention will now be described, by way of example only, with reference to the accompanying drawings.

Figure 1:
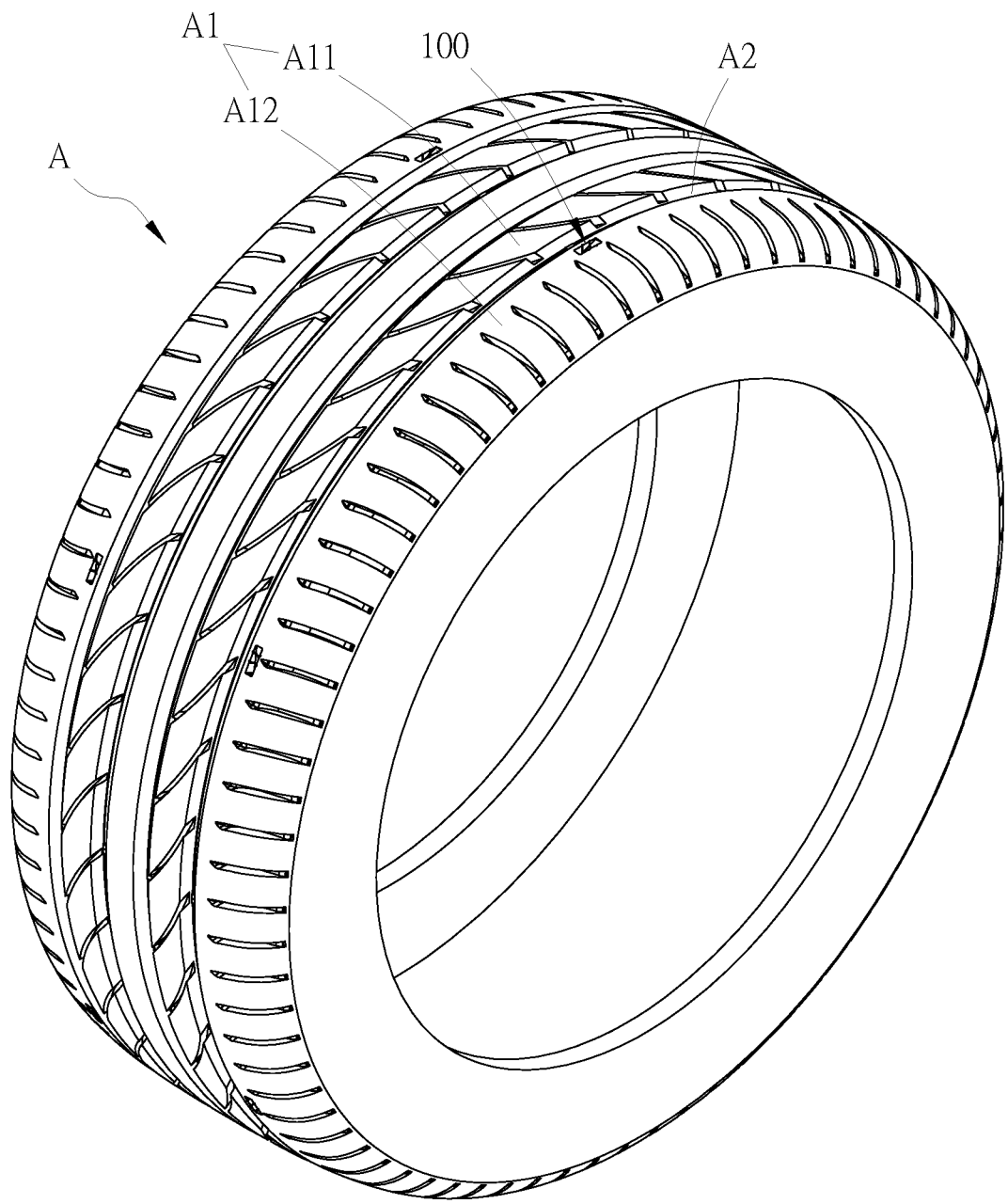
FIG. 1 is a schematic view of the implementation of a first embodiment of the present invention.
Figure 2:
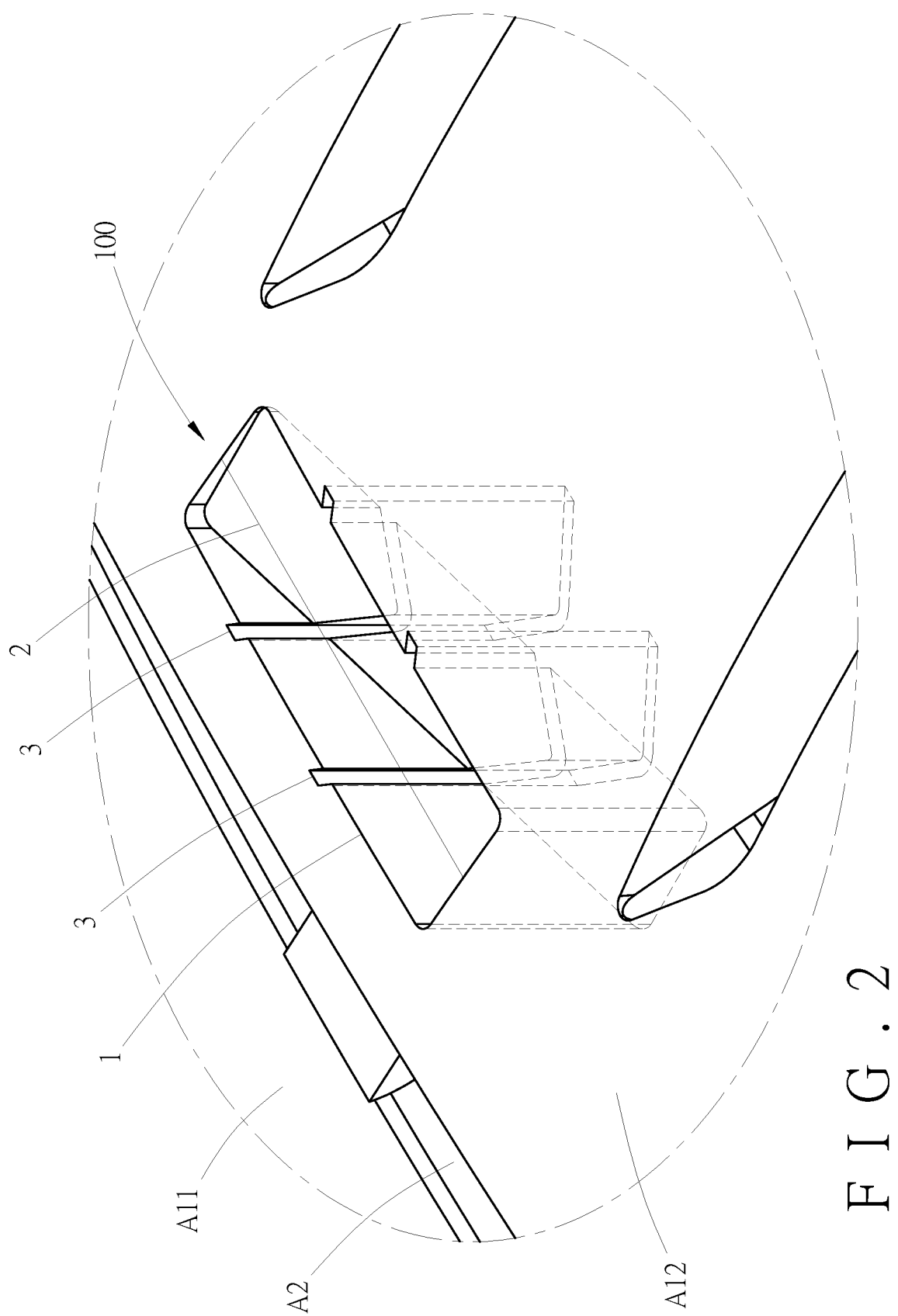
FIG. 2 is a perspective view of the first embodiment of the present invention.

FIG. 1 and FIG. 2 illustrate a first embodiment of a tire wear indicating structure 100 of the present invention, which may be disposed on a tire A provided by the present invention. The tire A may be any type of elastic vehicle tires, whether or not its interior is pressurized.

The tire A has a circumferential direction and a tangent direction tangent to the circumferential direction. The tangent direction is perpendicular to a rotation axis direction of the tire A.

The tire A has a tread portion A1 and a main groove A2 adjacent to the tread portion A1. When the tire A is not worn down, the main groove A2 has a main groove depth. The tread portion A1 includes a central segment A11 and a shoulder segment A12 that are arranged at two sides of the main groove A2, respectively. The tire wear indicating structure 100 is disposed on the shoulder segment A12.

Referring to FIG. 1 through FIG. 4, the tire wear indicating structure 100 includes an indicator 1. The indicator 1 is disposed on the shoulder segment A12 of the tread portion A1. The indicator 1 has an indicator depth D1 that is recessed from the tread portion A1 to the deepest. Preferably, the indicator 1 extends along an indicator direction, and the indicator direction is parallel to the tangential direction. Since the indicator 1 is disposed on the shoulder segment A12, the stiffness of the ribs on the central segment A11 will not be weakened, and the straight-line stability of the tire A can be maintained.

Preferably, the tire A has an inner side close to a vehicle body and an outer side away from the vehicle body. The indicator 1 may be arranged on both the inner side and the outer side.

There are at least six indicators 1 on the inner side and the outer side in the circumferential direction. When it is necessary to check the indicator 1, the indicator 1 can be seen easily, without turning or removing the tire A. Preferably, the positions and numbers of the indicators 1 on the inner side and the outer side are corresponding.

The indicator 1 appears as a rectangle on the surface of the tire A. The indicator 1 has an indicator length L1 and an indicator width W1 in the indicator direction. Preferably, the indicator length L1 is between 15 mm and 21 mm, and the indicator width W1 is 5 mm.

At least three inclined portions 2 of different heights are adjacently arranged to each other and located in the indicator 1. The heights of the inclined portions 2 decrease progressively along the indicator direction. In every adjacent two of the inclined portions 2 and in a cross section of the tread portion along the indicator direction, the lowest point of one inclined portion 2 is higher than the highest point of the other inclined portion 2 along the indicator direction. Preferably, the lengths of the inclined portions 2 in the indicator direction are the same as each other.

At least two indicating grooves 3 are disposed between the adjacent inclined portions 2. The indicating grooves 3 each have an indicating groove depth D2. The indicating groove depth D2 is the main groove depth minus 1.8 to 2.2 mm. The indicator depth D1 is the main groove depth minus 2.3 to 2.5 mm. The indicating groove depth D2 is greater than the indicator depth D1.

The indicating groove 3 is in the shape of a 〈 on the surface of the tire A. The indicating groove 3 has an indicating groove width W2. The indicating groove 3 extends beyond the indicator 1 in the rotation axis direction. Preferably, the indicating groove width W2 is 0.5 mm.

In a preferred embodiment of the present invention, in each indicator 1, the number of the inclined portions 2 is three, and the number of the indicating grooves 3 is two, so as to form the tire wear indicating structure similar to a battery symbol, but not limited thereto in actual implementation.

Figure 3:
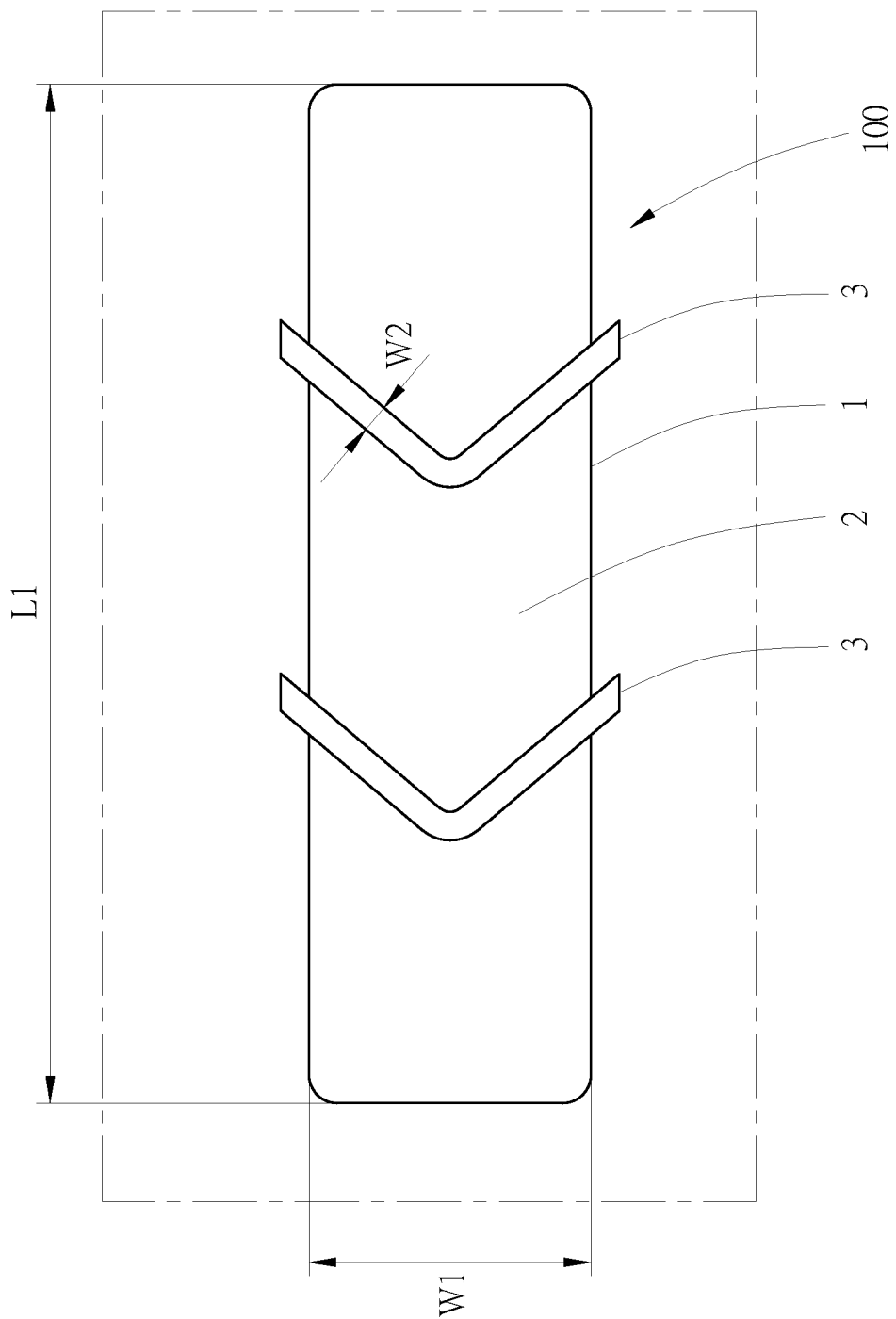
FIG. 3 is a first planar view of the first embodiment of the present invention in an implementation state, illustrating that the tire has not been worn down.
Figure 5:
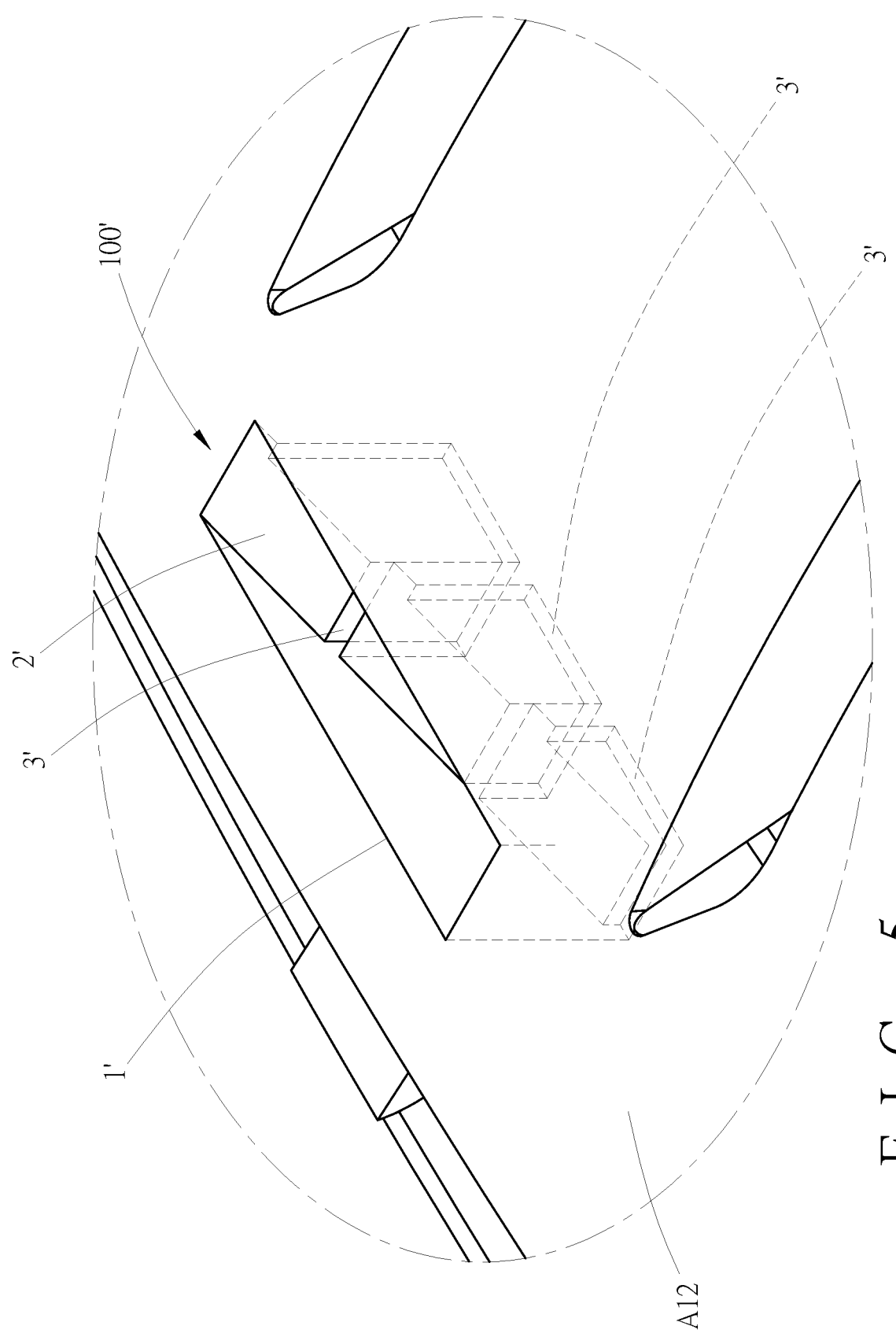
FIG. 5 is a perspective view of a second embodiment of the present invention.
Figure 6:
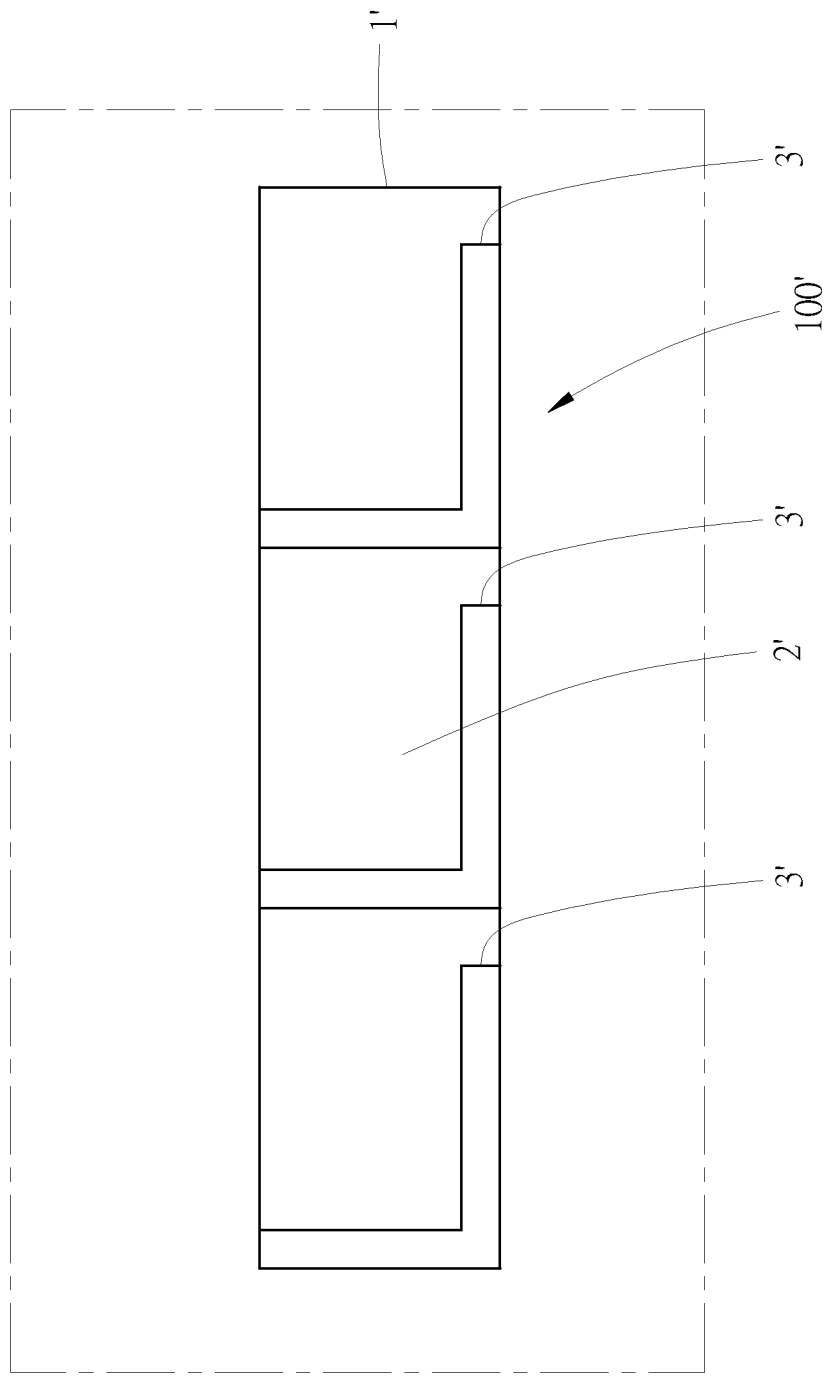
FIG. 6 is a planar view of the second embodiment of the present invention in an implementation state, illustrating that the tire has not been worn down.

FIG. 5 and FIG. 6 illustrate a second embodiment of a tire wear indicating structure 100' of the present invention. The second embodiment is substantially similar to the first embodiment with the exceptions described hereinafter. In the first embodiment, the indicating groove 3 is in the shape of a 〈 on the surface of the shoulder segment A12, as shown in FIG. 3. In the second embodiment, the indicating groove 3' is in the shape of an L on the surface of the shoulder segment A12.

In the second embodiment, there are three indicating grooves 3' and three inclined portions 2' in each indicator 1'. But, the number of the indicating grooves 3' and the number of the inclined portions 2' are not limited thereto in actual implementation.

Figure 7:
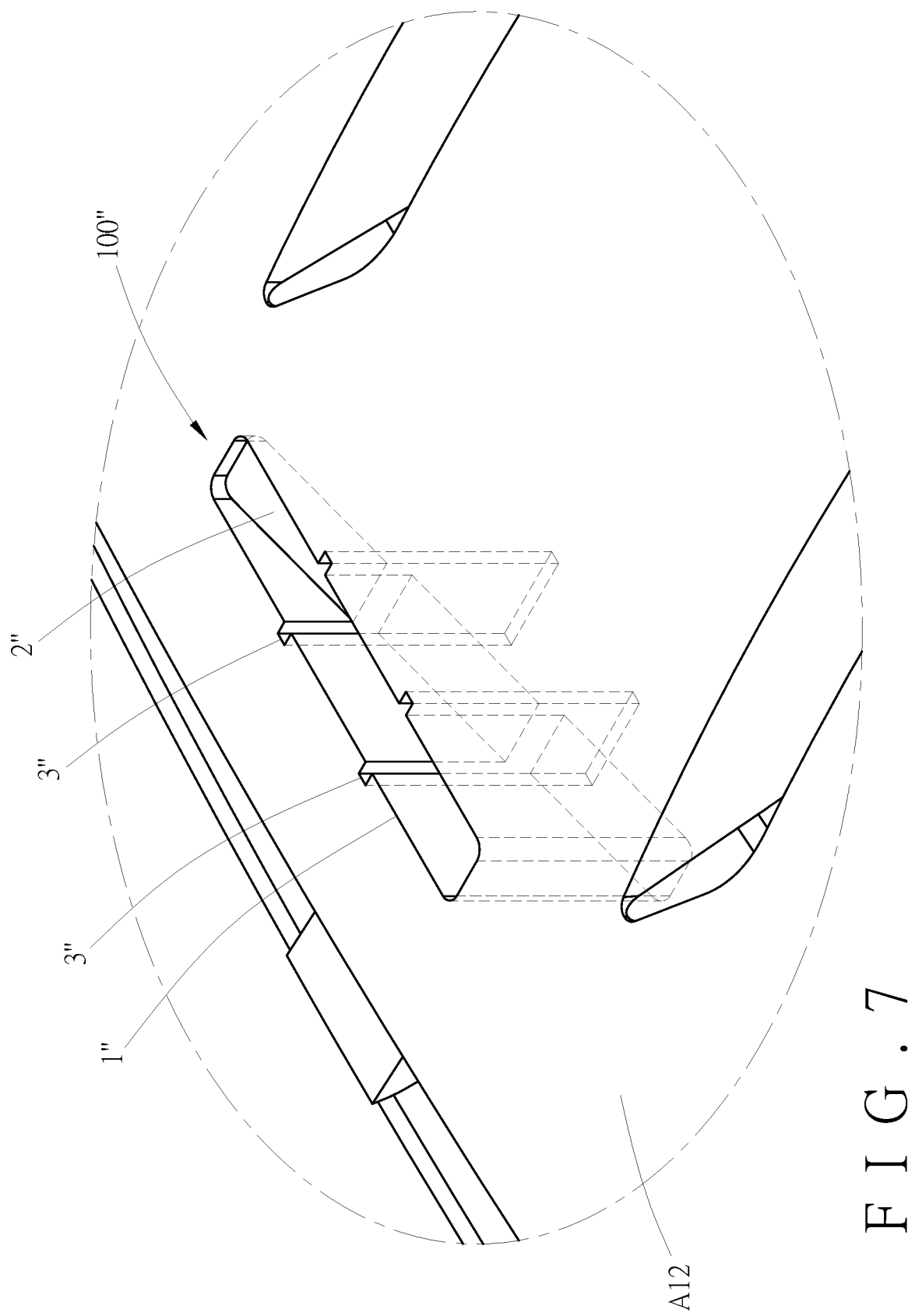
FIG. 7 is a perspective view of a third embodiment of the present invention.
Figure 8:
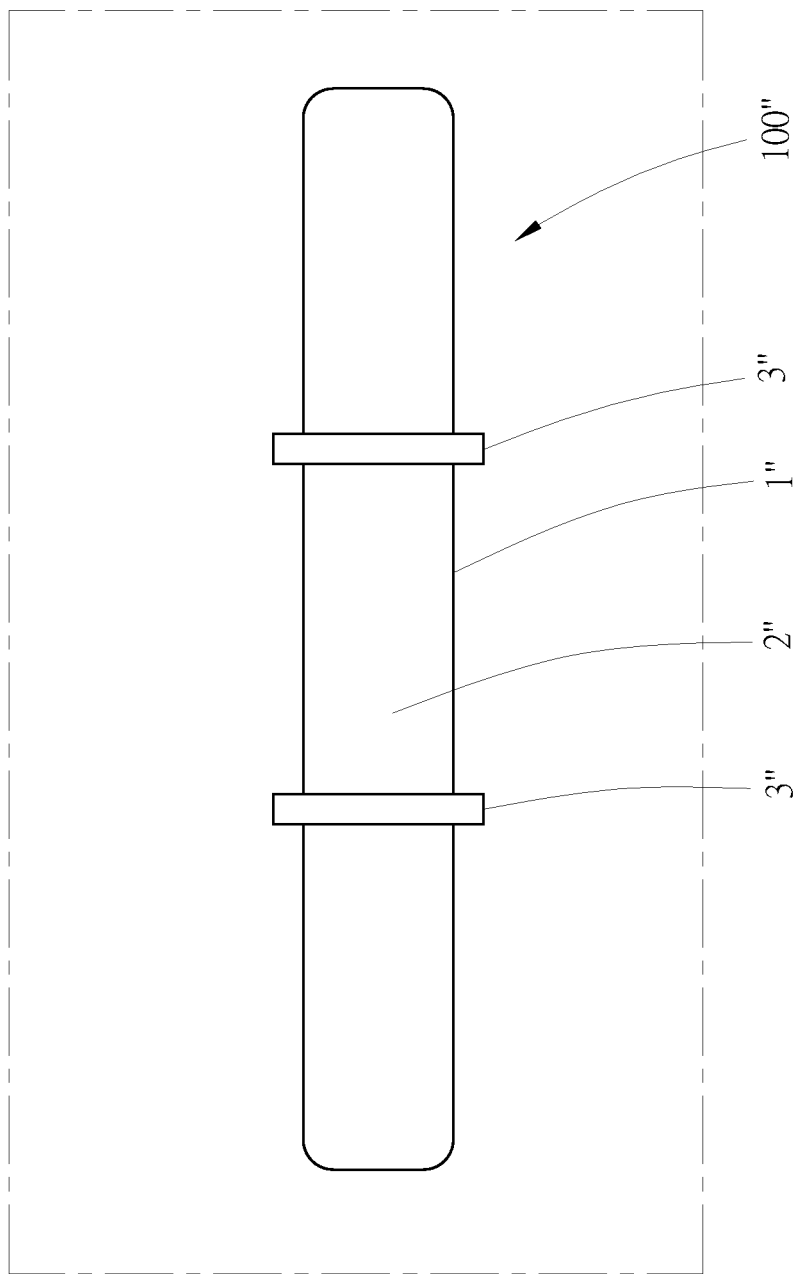
FIG. 8 is a planar view of the third embodiment of the present invention in an implementation state, illustrating that the tire has not been worn down.

FIG. 7 and FIG. 8 illustrate a third embodiment of a tire wear indicating structure 100''' of the present invention. The third embodiment is substantially similar to the first embodiment with the exceptions described hereinafter. In the first embodiment, the indicating groove 3 is in the shape of a 〈 on the surface of the shoulder segment A12, as shown in FIG. 3. In the third embodiment, the indicating groove 3" is in the shape of a straight line on the surface of the shoulder segment A12.

In the third embodiment, there are two indicating grooves 3" and three inclined portions 2" in each indicator 1". But, the number of the indicating grooves 3" and the number of the inclined portions 2" are not limited thereto in actual implementation.

It should be explained that the symbols a, b, c are only used to distinguish the tire wear indicating structures 100, 100a, 100b, 100c under different degrees of wear. Wear conditions from new to old are illustrated on the tire wear indicating structure 100 shown in FIG. 4, the tire wear indicating structure 100a shown in FIG. 10, the tire wear indicating structure 100b shown in FIG. 12 and the tire wear indicating structure 100c shown in FIG. 14.

Referring to FIG. 1 and FIG. 3, the 〈 shaped indicating groove 3 of the first embodiment is taken as an example. After the actual implementation of the tire wear indicating structure 100, the tire wear indicating structure 100 will be worn from the highest end as the tire A is worn down.

Figure 4:
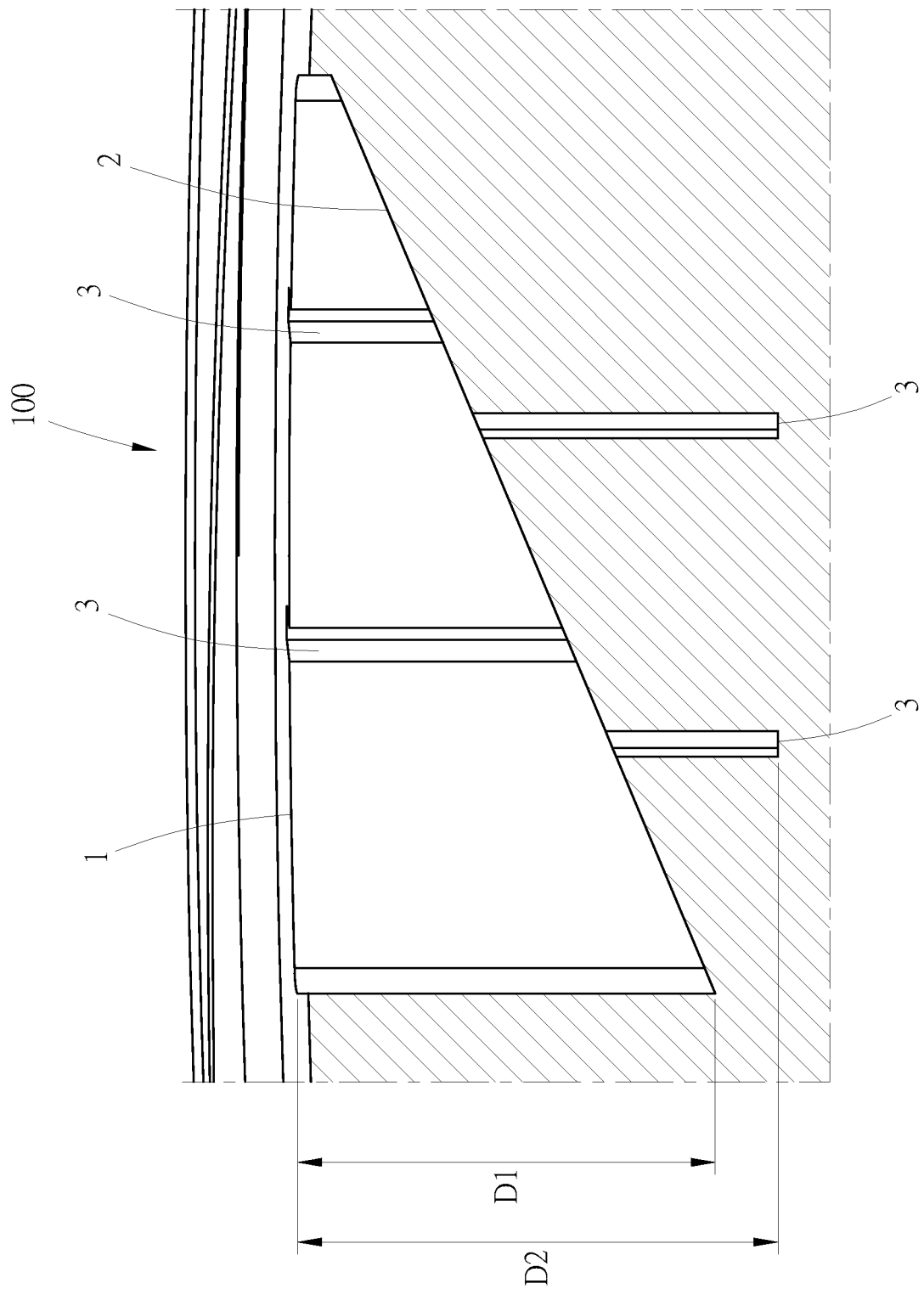
FIG. 4 is a first cross-sectional view of the first embodiment of the present invention in an implementation state, illustrating that the tire has not been worn down.
Figure 9:
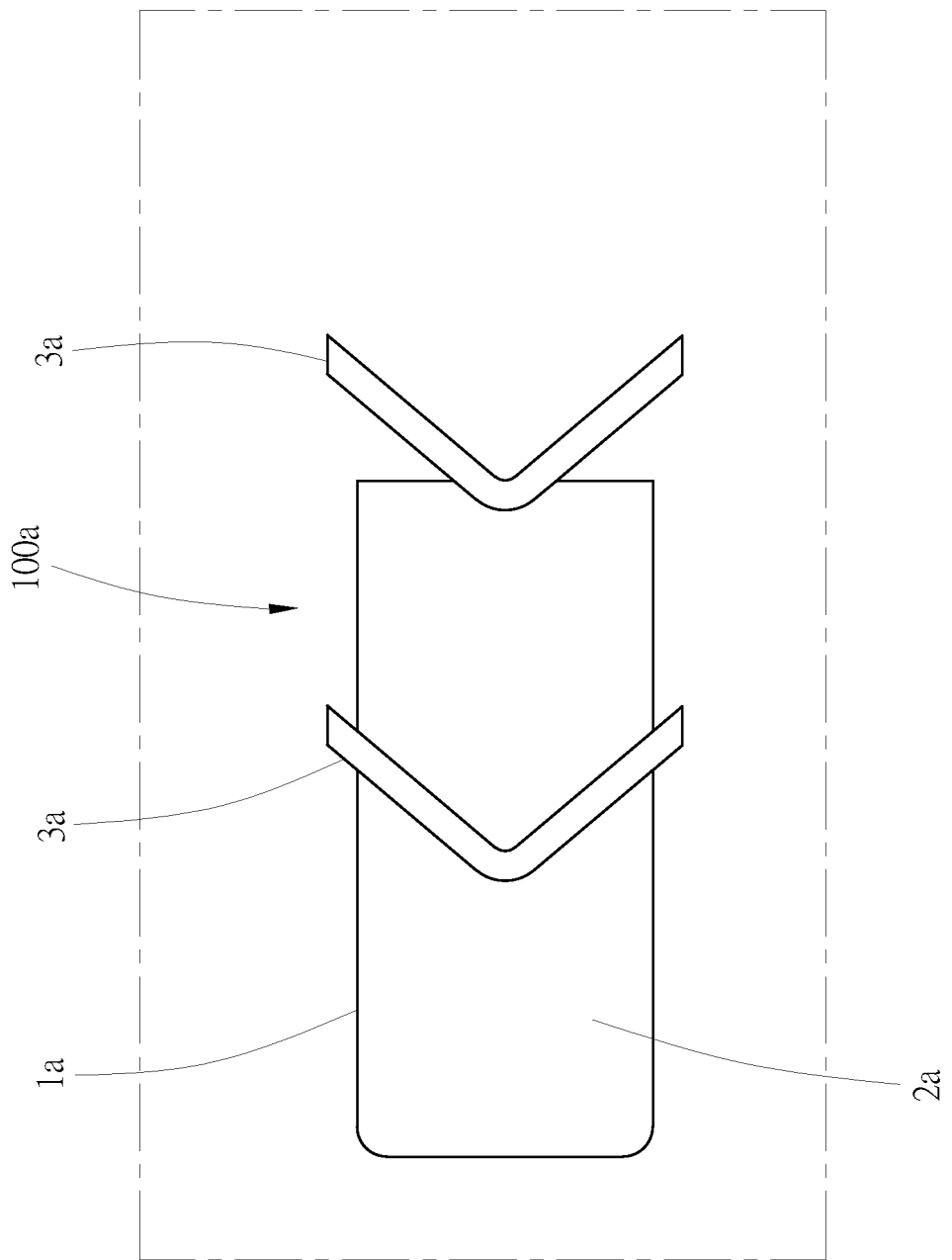
FIG. 9 is a second planar view of the first embodiment of the present invention in an implementation state, illustrating the tire wear process.
Figure 10:
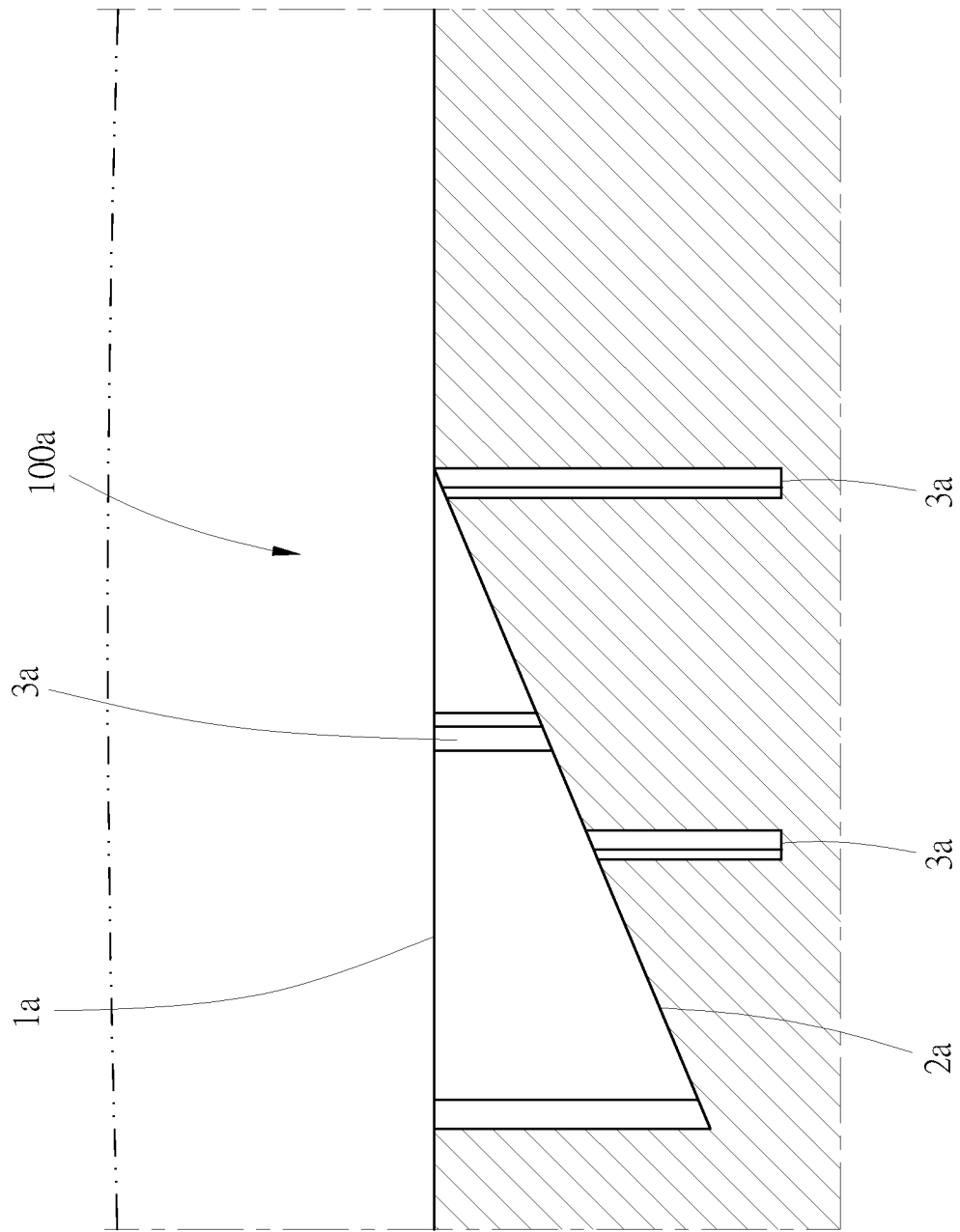
FIG. 10 is a second cross-sectional view of the first embodiment of the present invention in an implementation state, illustrating the tire wear process.

Please refer to FIG. 9 and FIG. 10, in cooperation with FIG. 1. When the inclined portion 2 shown in FIG. 4 is worn to the inclined portion 2a shown in FIG. 10, viewed from the cross section of the tire A, the edge of the indicator 1a is flush with the indicating groove 3a.

Figure 11:
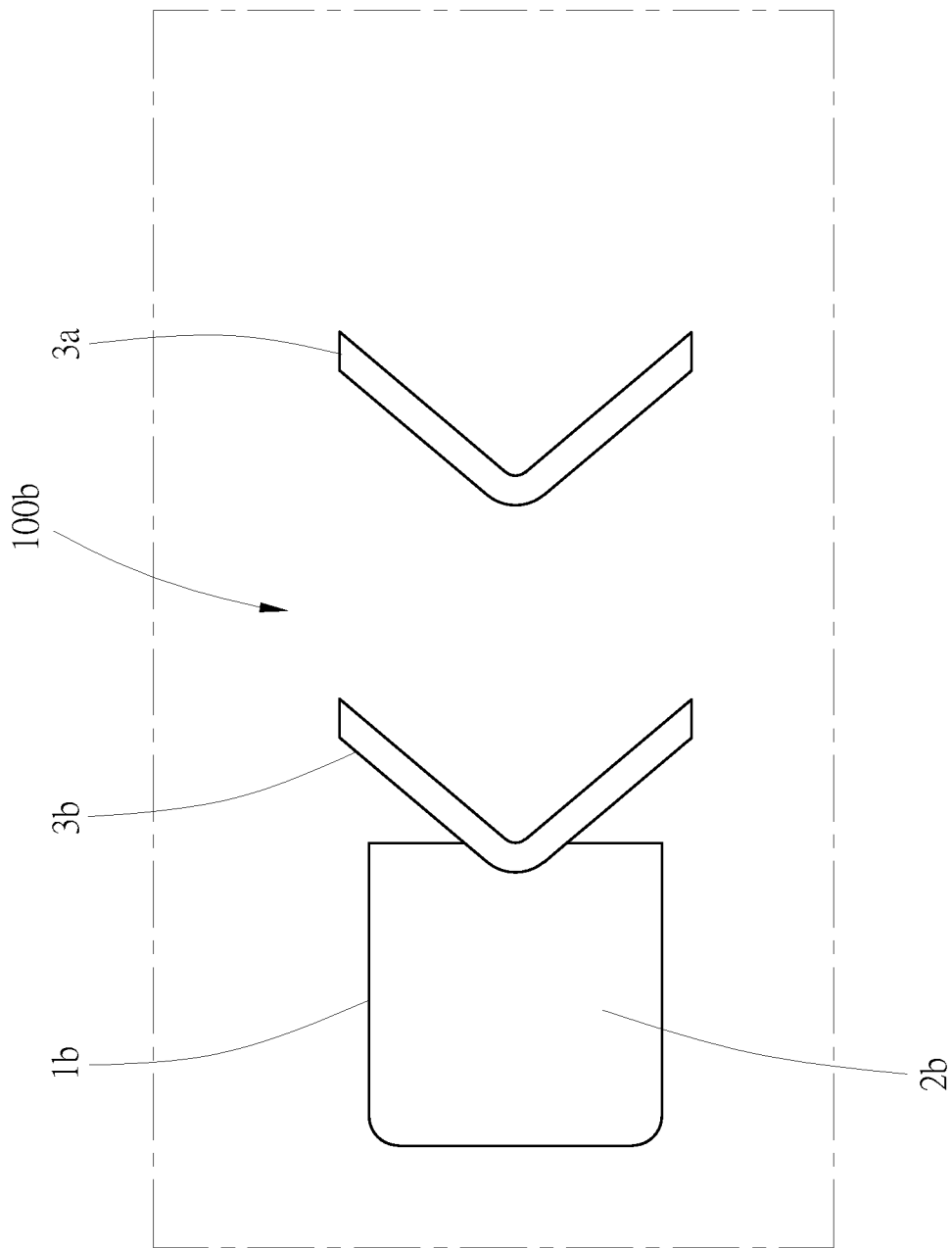
FIG. 11 is a third planar view of the first embodiment of the present invention in an implementation state, illustrating the tire wear process.
Figure 12:
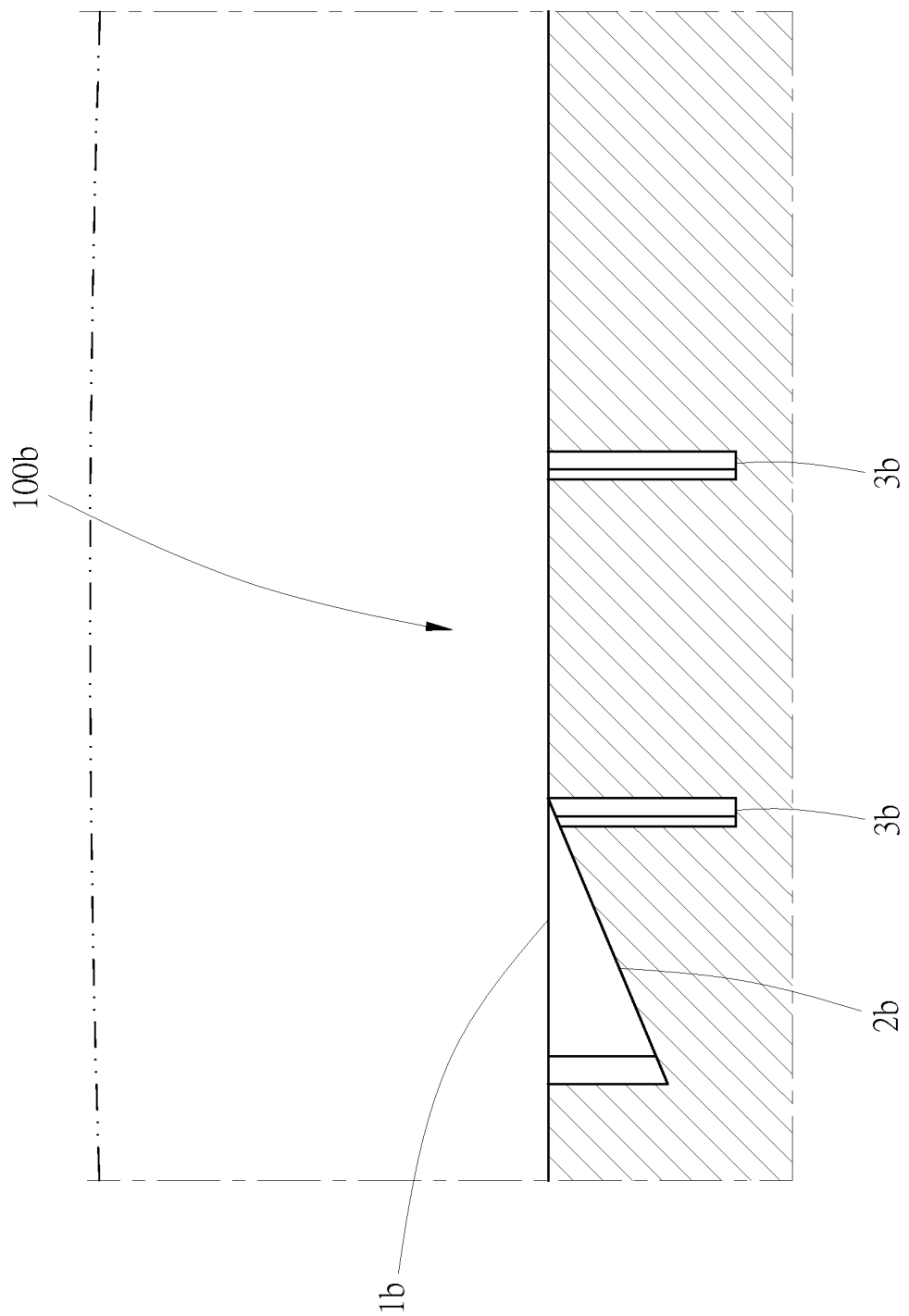
FIG. 12 is a third cross-sectional view of the first embodiment of the present invention in an implementation state, illustrating the tire wear process.

Please refer to FIG. 11 and FIG. 12, in cooperation with FIG. 1. The tire A continues to be worn. When the inclined portion 2a shown in FIG. 10 is worn to the inclined portion 2b shown in FIG. 12, viewed from the cross section of the tire A, the edge of the indicator 1b is flush with another indicating groove 3b, compared with FIG. 10.

Figure 13:
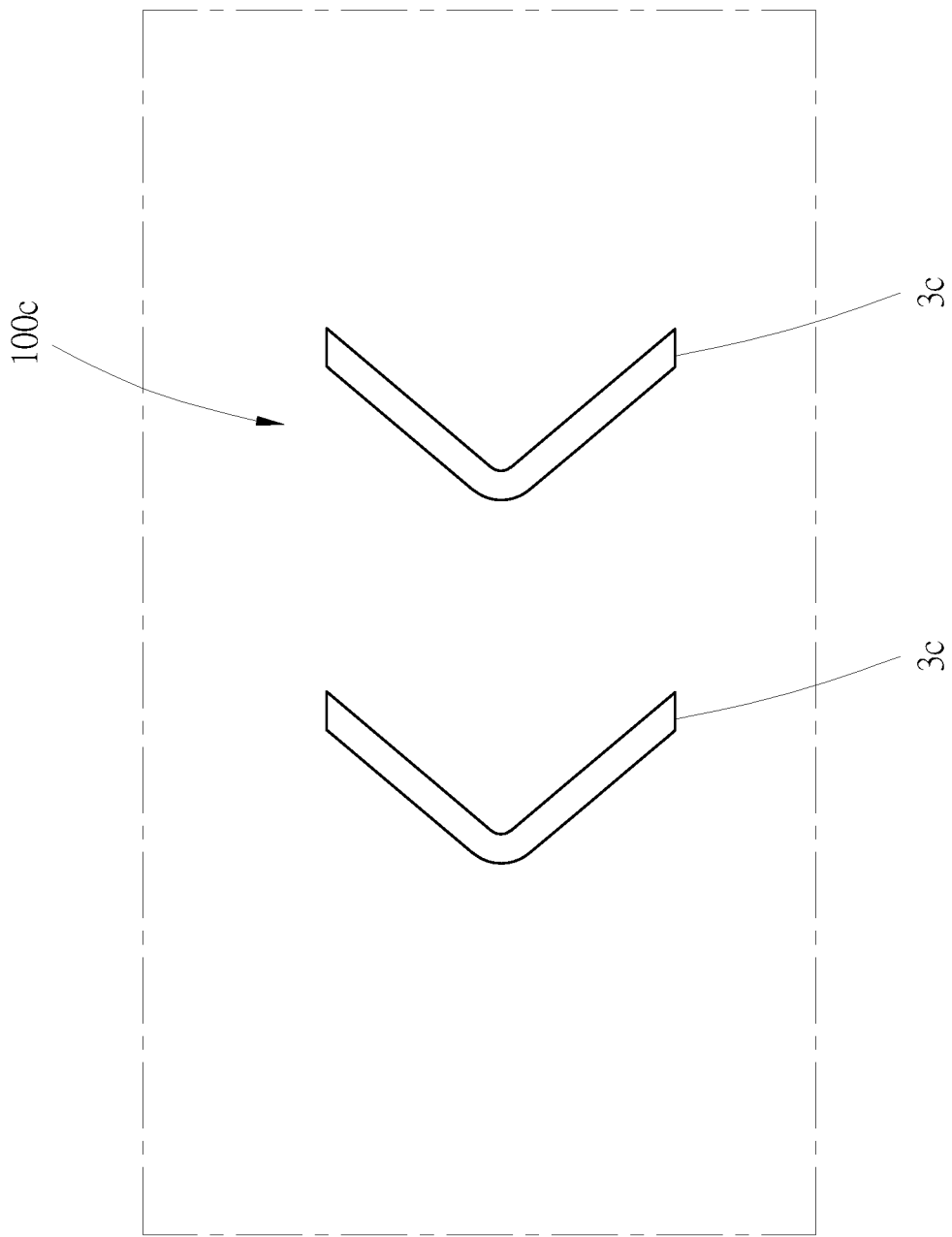
FIG. 13 is a fourth planar view of the first embodiment of the present invention in an implementation state, illustrating that the tire has been worn down.
Figure 14:
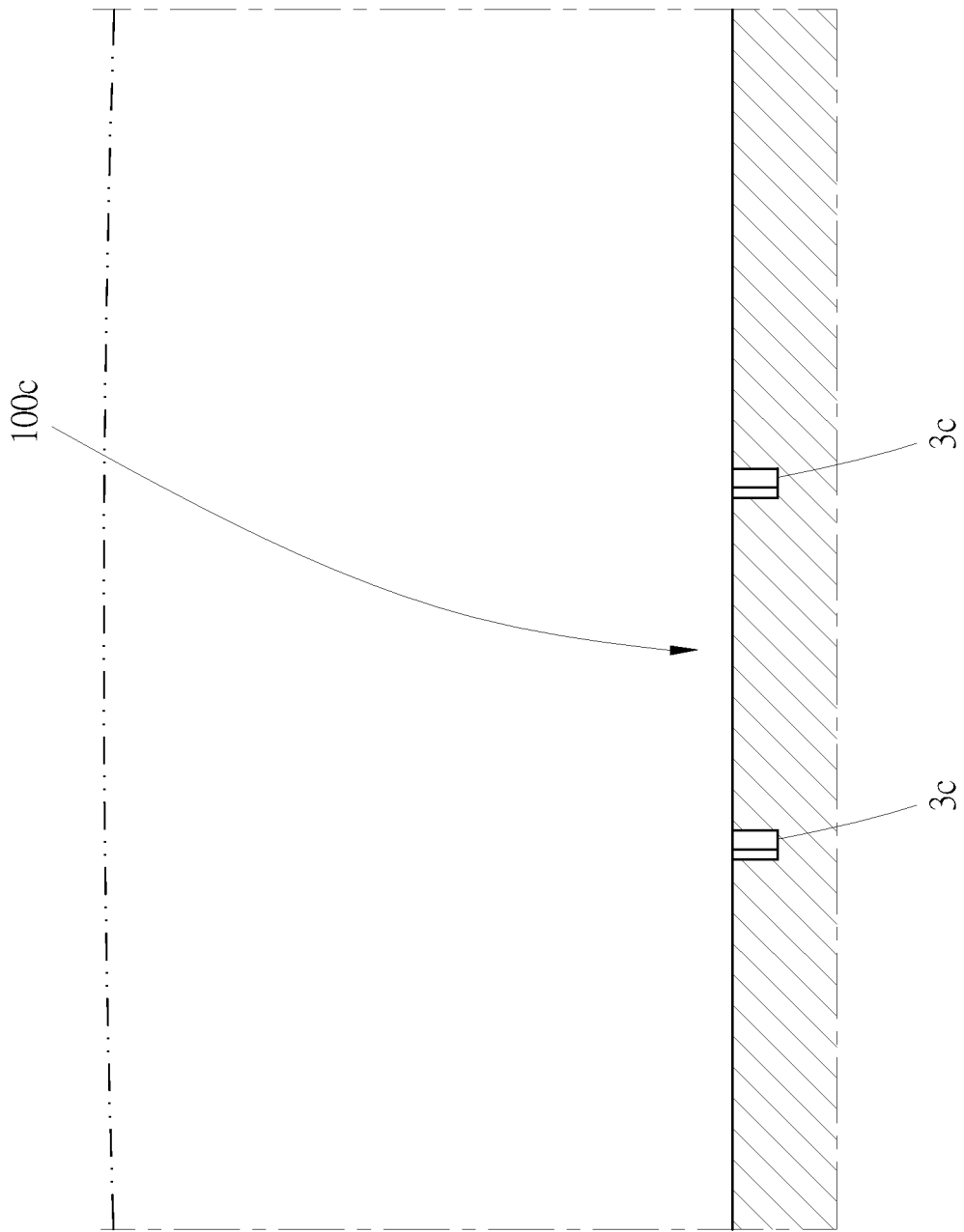
FIG. 14 is a fourth cross-sectional view of the first embodiment of the present invention in an implementation state, illustrating that the tire has been worn down.

Please refer to FIG. 13 and FIG. 14, in cooperation with FIG. 1. The tire A continues to be worn. When the inclined portion 2b shown in FIG. 12 is worn down to the point where the inclined portion cannot be seen as shown in FIG. 14, viewed from the cross section of the tire A, the indicator 1b disappears completely, and only the indicating groove 3c remains. At this time, the tire should be replaced.

The indicator depth D1 is the main groove depth minus 2.3 to 2.5 mm. The indicating groove depth D2 is the main groove depth minus 1.8 to 2.2 mm. When the indicator 1b disappears completely and only the indicating groove 3c remains, the main groove A2 still has a depth of at least 1.8 to 2.2 mm. Compared with the height of the conventional tire wear indicator, at least 1.6 mm, replacing the tire in time can avoid a drastic change in the performance of the tire A, thereby improving safety.

Figure 15:
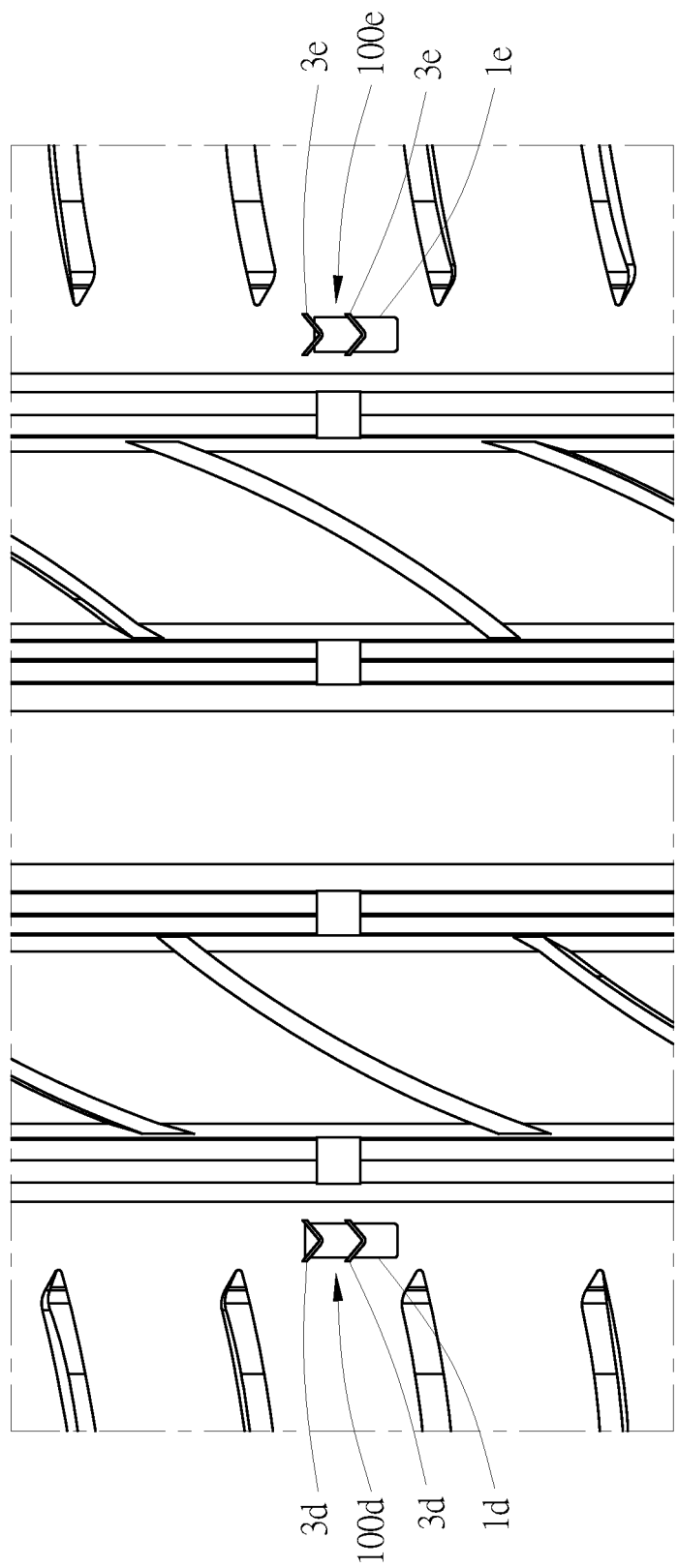
FIG. 15 is a fourth planar view of the first embodiment of the present invention in an implementation state, illustrating inconsistent wear on the inner side and outer side of the tire.

Please refer to FIG. 1 and FIG. 15. Because the inner side and the outer side of the tire A are provided with the tire wear indicating structures 100d. 100e, from the relationship between the indicators 1d, 1e and the indicating grooves 3d, 3e, it can be judged whether the wear conditions on both sides are consistent.

Assuming that the left side of FIG. 15 is the inner side and the right side is the outer side, when the indicator 1e on the right side is flush with the indicating groove 3e and the indicator 1d on the left side is not flush with the indicating groove 3d, the user can know that the tire A may have the possibility of the outer (right) irregular wear.

Because it is judged from the relationship between the indicators 1d, 1e and the indicating grooves 3d, 3e, there is no need to measure whether the lengths of the indicators 1d, 1e on both sides are consistent. The irregular wear of the tire A can be known quickly by visual inspection.

Please refer to FIG. 1, FIG. 3 and FIG. 9. With the cooperation of the indicators 1, 1a, the inclined portions 2, 2a, and the indicating grooves 3, 3a, the current wear condition of the tire A can be seen more intuitively, without too much information interfering with the judgment. For example, one of the inclined portions 2a shown in FIG. 9 has been worn, and the remaining two inclined portions 2a have not been worn, so the current wear condition of the tire A is 33% used.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A tread portion of a tire comprising at least a pair of tire wear indicating structures and a main groove having a main groove depth, each tire wear indicating structure including:
 an indicator formed as a cavity in the tread portion of the tire, the indicator having an indicator depth that is recessed from the tread portion, the indicator extending along an indicator direction, the indicator direction being in correspondence with a circumferential direction of the tire;
 at least three inclined portions of different heights, adjacently arranged to each other and located in the indicator, the heights of the inclined portions decreasing progressively along the indicator direction, wherein in every adjacent two of the inclined portions and in a cross section of the tread portion along the indicator direction, a lowest point of one inclined portion is higher than a highest point of the other inclined portion along the indicator direction; and
 at least two indicating grooves, disposed between the adjacent inclined portions and providing equal spacing of the inclined portions one with respect to an adjacent other, the at least two indicating grooves extending in a direction angularly offset from the indicator direction, the indicating grooves each having an indicating groove depth, the indicating groove depth being a depth of the main groove of the tire minus 1.8 to 2.2 mm, the indicating groove depth being greater than the indicator depth.

2. The tread portion as claimed in claim 1, wherein the tread portion includes a central segment and a pair of shoulder segments respectively arranged at two sides of the central segment, and the at least a pair of tire wear indicating structures being respectively disposed on a corresponding one of the pair of shoulder segments in aligned spaced relationship, whereby uneven wear is assessed by a visual comparison of the pair of tire wear indicating structures.

3. The tread portion as claimed in claim 1, wherein the indicator depth is the main groove depth minus 2.3 to 2.5 mm.

4. The tread portion as claimed in claim 1, wherein the inclined portions have a same length in the indicator direction.

5. The tread portion as claimed in claim 1, wherein the tire has an inner side and an outer side, and the least a pair of tire wear indicating structures are respectively arranged on the inner side and the outer side, whereby uneven wear is assessed by a visual comparison of the pair of tire wear indicating structures.

6. A tire comprising:
 a tread portion having inner and outer sides, each of the inner and outer sides of the tread portion being formed by a central segment, a shoulder segment adjacent the central segment, and a main groove disposed between the central segment and corresponding shoulder segment of the tread portion; and
 a multiplicity of tire wear indicating structures, the multiplicity of tire wear indicating structures being formed by a plurality of pairs of tire wear indicating structures, each tire wear indicating structure of the plurality of pairs of tire wear indicating structures being disposed in a corresponding shoulder segment of a respective one of the inner and outer sides of the tread portion, the plurality of pairs of tire wear indicating structures being disposed in angularly spaced relationship one from another with respect to a rotation axis of the tire;
 each of the multiplicity of tire wear indicating structures include:
  an indicator formed as a cavity in the tread portion, the indicator having an indicator depth, the indicator extending along an indicator direction, the indicator direction being in correspondence with a circumferential direction of the tire;
  at least three inclined portions of different heights, adjacently arranged to each other and located in the indicator, the heights of the inclined portions decreasing progressively along the indicator direction, wherein in every adjacent two of the inclined portions and in a cross section of the tread portion along the indicator direction, a lowest point of one inclined portion is higher than a highest point of the other inclined portion along the indicator direction;

at least two indicating grooves, respectively disposed between the adjacent inclined portions and extending in a direction angularly offset from the indicator direction, the indicating grooves each having an indicating groove depth, the indicating groove depth being the main groove depth minus 1.8 to 2.2 mm, the indicating groove depth being greater than the indicator depth, whereby uneven wear is assessed by a visual comparison of the pair of tire wear indicating structures.

7. The tire as claimed in claim 6, wherein the indicator depth is the main groove depth minus 2.3 to 2.5 mm.

8. The tire as claimed in claim 6, wherein the inclined portions have a same length in the indicator direction.

\* \* \* \* \*